W. H. SAWYER.
METHOD OF MEASURING FLOWING WATER.
APPLICATION FILED SEPT. 10, 1915.
1,200,654.
Patented Oct. 10, 1916.
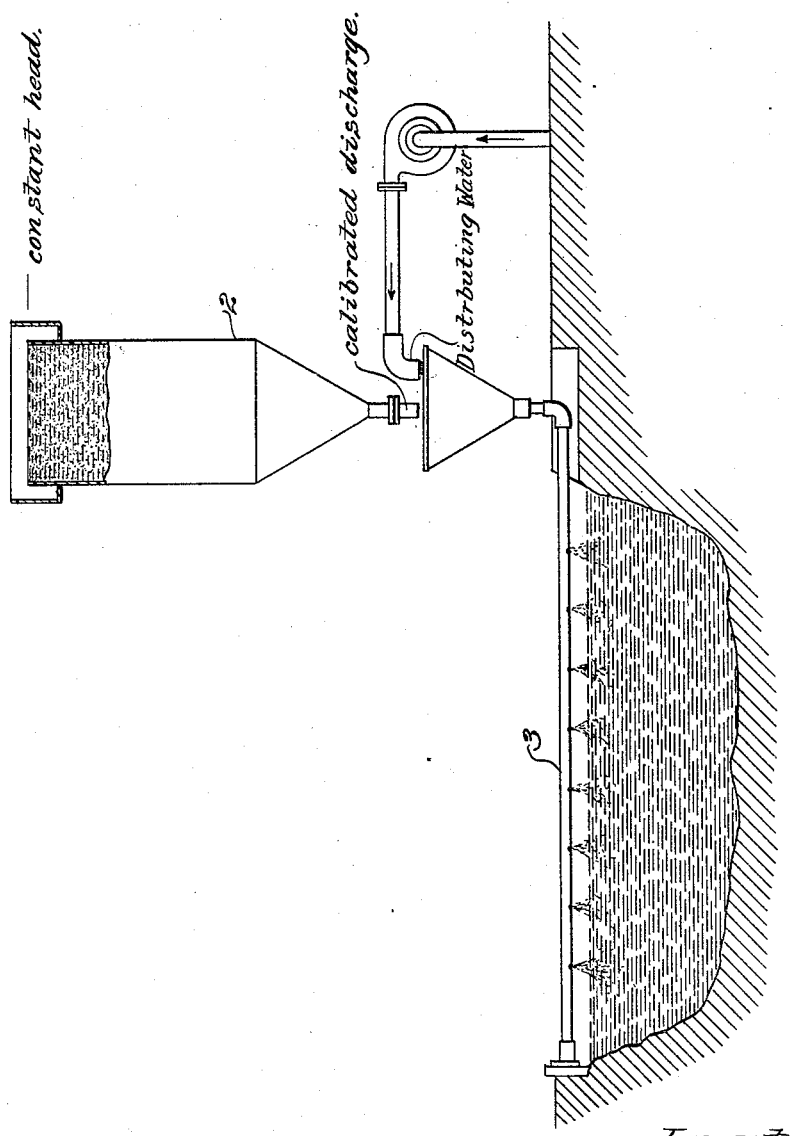
Inventor:
Walter H. Sawyer.
By
Attorney.

UNITED STATES PATENT OFFICE.

WALTER HOWARD SAWYER, OF AUBURN, MAINE.

METHOD OF MEASURING FLOWING WATER.

1,200,654.   Specification of Letters Patent.   Patented Oct. 10, 1916.

Application filed September 10, 1915. Serial No. 49,905.

*To all whom it may concern:*

Be it known that I, WALTER H. SAWYER, a citizen of the United States, residing at Auburn, county of Androscoggin, State of Maine, have invented certain new and useful Improvements in Methods of Measuring Flowing Water, of which the following is a specification.

This invention relates to the determination of the amount of flowing water and particularly to a method of ascertaining the volume of water used by a water turbine as a basis of calculation of the amount to be paid by power users to the owners of water rights and as to the basis for computing the efficiency of turbines.

In ascertaining the flow of water in streams, various methods have been employed. These methods, generally speaking have been either the measurement of the cross section of the stream and the velocity of the current by a current meter or otherwise, and the so called chemical method in which soluble matter is dissolved and introduced into the stream in known quantity and rate, and the resultant solution after mixture tested to determine the degree of dilution.

My present invention relates more particularly to the latter class of methods but differs radically therefrom. The chemical method has been open to serious objection on account of the expense and care and skill required and the time necessary for performing the test. The result, while highly accurate, can only be justified in water powers of great value, where efficiency of large turbines must be ascertained, or where large amounts of money are involved for water privileges.

The general method involved in my present invention is based upon the utilization of matter which may be carried in suspension as distinguished from soluble matter. One of the great difficulties of the problem has been to find a matter or material which could be carried in true suspension. The tendency to float or the tendency to sink is likely to prevent perfection of distribution. I have discovered that such material as wood meal may be ground to varying finenesses so as to secure for a certain period of time, depending on its degree of fineness, a practically perfect suspension in moving water. This "period of suspension" as it may be termed varies with the degree of cellular integrity of the grains of meal. That is to say, a large grain has a considerable degree of cell structure remaining intact and the grain has a corresponding buoyancy and will keep afloat until its cell walls are penetrated by the water and the air expelled. A smaller grain has less cell structure and hence less buoyancy. In fact, wood meal may be ground to a fineness where its cell structure is practically eliminated and the meal will sink readily. The details of this feature will be more fully disclosed hereinafter as also its application.

In brief the method as involved in my present invention consists in providing a material such as wood meal of a predetermined fineness so that it will maintain a specific gravity of one as compared with water during the period required to make the test, in introducing this material in suspension into the stream above the point of measurement with a uniform and symmetrical distribution, in a known amount and at a known rate, in taking characteristic samples from the stream at the point of measurement after a complete mixture has taken place in the stream, and in determining the amount of suspended material in the sample. This is compared with the amount of material added to the stream. The flow is determined by the rule that the amount of material in suspension added to the stream is to the amount of material in the sample taken inversely as the amount of suspending liquid added initially is to the amount of flow.

In practising my invention, the wood meal is so ground and screened that it will neither sink to the bottom nor rise to the top of the water with the amount of agitation furnished by the running water during the period of time between the introduction of the material into the stream and the time of the test, that is, the fineness depends partly upon the rapidity of flow of the stream and the conditions of the test.

The drawing illustrates diagrammatically one form of apparatus for introducing the meal or medium to the stream at a predetermined rate.

In practising my invention I take wood meal of the proper predetermined fineness and first wash it to remove the soluble matter present in the meal. The meal is then mixed with water and delivered to the stream at a known rate. A simple form of apparatus for introducing the meal or medium consists of a regulating feeder 2 issuing the substance to any suitable distributer 3, arranged adjacent or in the stream. After the meal has become completely distributed in the water, samples are taken and an average sample secured which is tested by filtering out the meal in a given volume of water and in carefully drying the meal and in weighing it. The same is done with samples of the meal mixed with water which was delivered to the stream and a sample of this is taken and filtered and dried and weighed as with the diluted sample.

The sample of wood meal which is added to the stream should be taken and carefully dried at a temperature above the boiling point of water until a constant weight is obtained, and the wood meal filtered from the sample of water should be similarly treated.

For very accurate results, especially on turbid waters, it will be necessary to determine the amount of material held naturally in suspension in the water by filtration of a sample of the original water through a filter of corresponding fineness to the filter which is to be used for finally filtering out the wood meal. In obtaining the final result, the amount of suspended matter held in the original water should be deducted from the amount finally found.

Instead of adding the wood meal to the stream in a mixture with water in predetermined quantity and rate, the wood meal may be added to the stream in a dry state by mechanical means at a known rate of weight per unit of time. The measured sample of water is taken after thorough admixture of the meal with the flowing water and the quantity of wood meal found therein is carefully weighed, then the amount of flowing water per unit of time is to the volume of the measured sample as is the amount of wood meal added to the stream per same unit of time to the amount of wood meal found in the sample, for instance:—

Let A represent the amount of wood meal added in grams to the stream per minute= 50,000.

Let B represent the sample of water taken=1 cubic foot.

Let C represent the amount in grams of wood meal found in B=5.

Let X represent the amount of water flowing in cubic feet per minute.

Then
$$A:C::X:B$$
or
$$X = \frac{A \times B}{C} = X = \frac{50,000 \times 1}{5} = 10,000.$$

The discussion above given is made somewhat detailed for the purpose of a full disclosure but I wish it understood that while I consider the details valuable as given, the method may obviously be varied and for the purposes of my protection, insist that all modifications within the limits of the appended claims be included as my invention.

What I therefore claim and desire to secure by Letters Patent is:

1. The method of measuring the flow of a stream of water, which consists in adding to the stream at a predetermined rate an insoluble powder, in such a condition as to become disseminated quickly throughout the water of the stream and of a specific gravity of approximately unity as compared with water, in determining the amount of powder in a sample of the water taken after the powder has become thoroughly disseminated therein and utilizing the data thus obtained to determine the flow.

2. The method of measuring the flow of a stream of water, which consists in adding to the stream at a predetermined rate an insoluble powder consisting of wood meal of a fineness such as to have a specific gravity of unity as compared with water, and in such a condition as to become disseminated quickly throughout the water of the stream, in determining the amount of powder in a sample of the water taken after the powder has become thoroughly disseminated therein and utilizing the data thus obtained to determine the flow.

3. The method of measuring a stream of flowing water which consists in adding at a predetermined rate to the stream a mixture consisting of insoluble material suspended in water, the material having a specific gravity of approximately unity as compared with water, in determining the amount of material in a sample of the flowing water after the mixture has become disseminated therein, in determining the amount of material in a corresponding sample of the mixture added to the stream, and in computing the flow by the rule that the quantity of water flowing, per minute, is inversely proportionate to the quantity of mixture added, as is also the amount of suspended material in the dilute sample to the amount of suspended material in the mixture added.

In testimony whereof I affix my signature in presence of two witnesses.

WALTER HOWARD SAWYER.

Witnesses:
EDWARD G. LEE,
A. B. ANDREW.